US011908613B2

(12) United States Patent
Yamamoto et al.

(10) Patent No.: US 11,908,613 B2
(45) Date of Patent: Feb. 20, 2024

(54) REACTOR

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Shinichiro Yamamoto, Yokkaichi (JP); Kohei Yoshikawa, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 638 days.

(21) Appl. No.: 16/977,407

(22) PCT Filed: Feb. 19, 2019

(86) PCT No.: PCT/JP2019/006109

§ 371 (c)(1),
(2) Date: Sep. 1, 2020

(87) PCT Pub. No.: WO2019/171940

PCT Pub. Date: Sep. 12, 2019

(65) Prior Publication Data

US 2021/0043368 A1 Feb. 11, 2021

(30) Foreign Application Priority Data

Mar. 5, 2018 (JP) ................................ 2018-039159
Sep. 20, 2018 (JP) ................................ 2018-175975

(51) Int. Cl.
*H01F 17/04* (2006.01)
*H01F 27/30* (2006.01)
(Continued)

(52) U.S. Cl.
CPC ......... *H01F 27/306* (2013.01); *H01F 27/255* (2013.01); *H01F 27/324* (2013.01)

(58) Field of Classification Search
CPC .................................................. H01F 27/2823
(Continued)

(56) References Cited

U.S. PATENT DOCUMENTS

2014/0218158 A1* 8/2014 Miyamoto ............. H01F 37/00 336/198
2015/0043262 A1* 2/2015 Ito .......................... H01F 37/00 336/178

(Continued)

FOREIGN PATENT DOCUMENTS

WO 2015-190215 A1 12/2015

OTHER PUBLICATIONS

International Search Report, Application No. PCT/JP2019/006109, dated Apr. 9, 2019. ISA/Japan Patent Office.

*Primary Examiner* — Ronald Hinson
(74) *Attorney, Agent, or Firm* — Honigman LLP

(57) ABSTRACT

A reactor includes: a coil; a magnetic core arranged inside of the wound portion and an outer core portion arranged outside of the wound portion; and a resin molded portion. An interval between the wound portion and the inner core portion differs in a peripheral direction of the wound portion. The reactor includes an electrically insulating material that is interposed in a location at which the interval is the narrowest, and a thick portion that is interposed in a location at which the interval is the widest and forms a portion of the inner resin portion. The proportion of the interval of the narrowest location with respect to the thermal conductivity is less than the proportion of the interval with respect to the thermal conductivity.

8 Claims, 5 Drawing Sheets

(51) Int. Cl.
*H01F 27/32* (2006.01)
*H01F 27/255* (2006.01)

(58) Field of Classification Search
USPC .................................................. 336/212, 221
See application file for complete search history.

(56) References Cited

U.S. PATENT DOCUMENTS

| | | | | |
|---|---|---|---|---|
| 2016/0055953 | A1* | 2/2016 | Hirata | H01F 27/327<br>336/96 |
| 2016/0189862 | A1* | 6/2016 | Miyauchi | H01F 37/00<br>29/606 |
| 2016/0322150 | A1* | 11/2016 | Inaba | H01F 41/02<br>336/205 |
| 2019/0259532 | A1* | 8/2019 | Hirabayashi | H01F 27/2823 |
| 2020/0035398 | A1* | 1/2020 | Hirabayashi | H01F 37/00 |
| 2020/0051729 | A1* | 2/2020 | Uekusa | H01F 41/0246 |

* cited by examiner

REACTOR

CROSS-REFERENCE TO RELATED APPLICATIONS

This application is the U.S. national stage of PCT/JP2019/006109 filed on Feb. 19, 2019, which claims priority of Japanese Patent Application No. JP 2018-039159 filed on Mar. 5, 2018 and Japanese Patent Application No. 2018-175975 filed on Sep. 20, 2018, the entire contents of which are incorporated herein by reference.

TECHNICAL FIELD

The present disclosure relates to a reactor.

BACKGROUND

JP 2017-135334A discloses, as a reactor to be used in an in-vehicle converter or the like, a reactor that includes a coil including a pair of wound portions, a magnetic core that is arranged inside and outside of the wound portions, and a resin molded portion that covers the outer periphery of the magnetic core. The above-described magnetic core includes multiple core pieces that are assembled in a ring shape. The above-described resin molded portion exposes the coil without covering it.

Further improvement of a heat dissipation property is desired in a reactor. If a coil is exposed from a resin molded portion as described above, the wound portion of the coil can come into direct contact with a liquid refrigerant or wind from a fan, for example. This kind of reactor has an excellent heat dissipation property. Also, if the installation target to which the reactor is attached includes a cooling mechanism, or a cooling mechanism is provided independently of the installation target in the surrounding area of the location in which the reactor is installed, the wound portion of the coil can be brought close to the installation target or the cooling mechanism. This kind of reactor has an excellent heat dissipation property. However, a reactor with a more excellent heat dissipation property is desired due to reasons such as an increase in the temperature of the coil and the magnetic core accompanying an increase in current, and a reduction of the heat dissipation area accompanying a reduction of the size of the reactor.

SUMMARY

A reactor of the present disclosure includes a coil having a wound portion; a magnetic core that includes an inner core portion arranged inside of the wound portion and an outer core portion arranged outside of the wound portion; and a resin molded portion including an inner resin portion that fills at least a portion between the wound portion and the inner core portion and an outer resin portion that covers at least a portion of the outer core portion, in which an interval between the wound portion and the inner core portion differs in a peripheral direction of the wound portion. The reactor includes an electrically insulating material that is interposed in a location at which the interval is the narrowest, and a thick portion that is interposed in a location at which the interval is the widest and forms a portion of the inner resin portion, and letting a thermal conductivity of the electrically insulating material be λ1, the interval of the narrowest location be t1, and the proportion of the interval t1 with respect to the thermal conductivity λ1 be (interval t1/thermal conductivity λ1), and letting a thermal conductivity of the electrically insulating material be λ2, the interval of the widest location be t2, and the proportion of the interval t2 with respect to the thermal conductivity λ2 be (interval t2/thermal conductivity λ2), (interval t1/thermal conductivity λ1)<(interval t2/thermal conductivity λ2) is satisfied.

Effect of the Present Disclosure

The reactor of the present disclosure has an excellent heat dissipation property.

DISCLOSURE

Detailed Description of Preferred Embodiments

Figure 1:
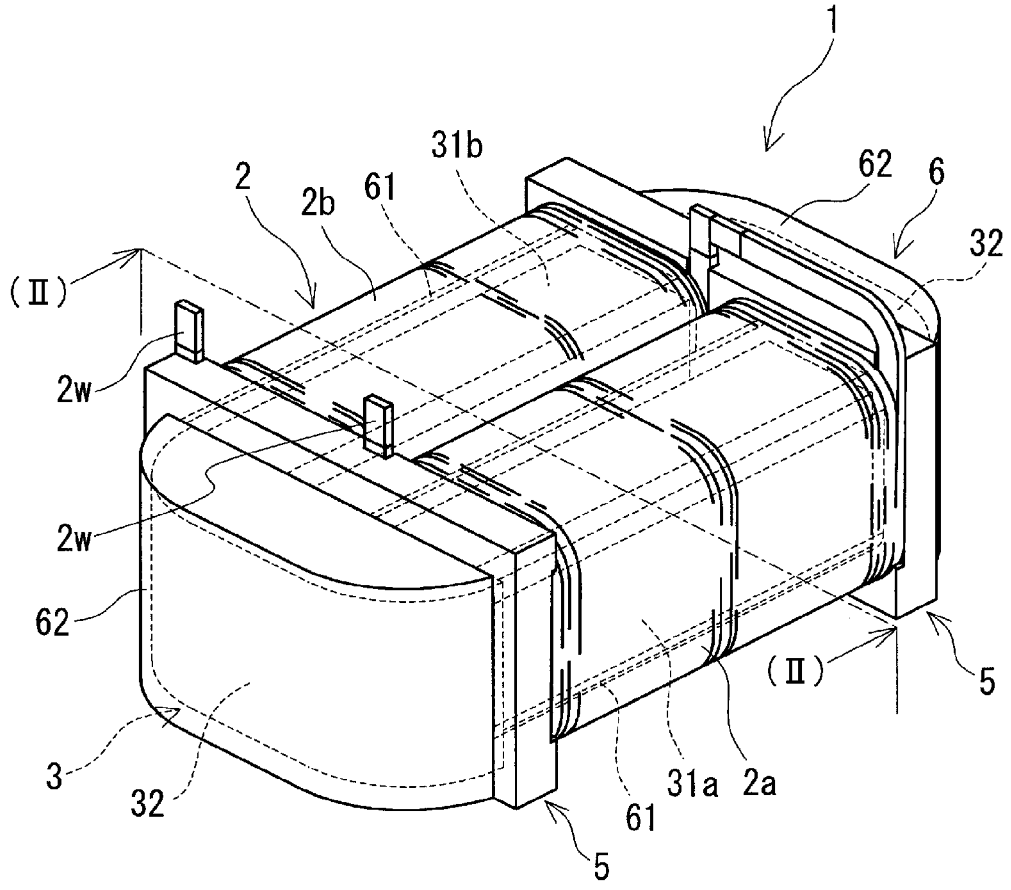
FIG. 1 is a schematic perspective view showing a reactor according to a first embodiment.

First, embodiments of the present disclosure will be listed and described.

A reactor of the present disclosure includes a coil having a wound portion; a magnetic core that includes an inner core portion arranged inside of the wound portion and an outer core portion arranged outside of the wound portion; and a resin molded portion including an inner resin portion that fills at least a portion between the wound portion and the inner core portion and an outer resin portion that covers at least a portion of the outer core portion, in which an interval between the wound portion and the inner core portion differs in a peripheral direction of the wound portion. The reactor includes an electrically insulating material that is interposed in a location at which the interval is the narrowest, and a thick portion that is interposed in a location at which the interval is the widest and forms a portion of the inner resin portion, and letting a thermal conductivity of the electrically insulating material be λ1, the interval of the narrowest location be t1, and the proportion of the interval t1 with respect to the thermal conductivity λ1 be (interval t1/thermal conductivity λ1), and letting a thermal conductivity of the electrically insulating material be λ2, the interval of the widest location be t2, and the proportion of the interval t2 with respect to the thermal conductivity λ2 be (interval t2/thermal conductivity λ2), (interval t1/thermal conductivity λ1)<(interval t2/thermal conductivity λ2) is satisfied.

The reactor of the present disclosure has an excellent heat dissipation property due to the following reasons.

The outer peripheral surface of the wound portion of the coil is exposed and is substantially not covered by the resin molded portion. For this reason, for example, the wound portion can come into direct contact with a liquid refrigerant or air from a fan. In addition, the wound portion can be brought close to the cooling mechanism or to the installation target including the cooling mechanism. This kind of reactor of the present disclosure has an excellent heat dissipation efficiency.

There is a relatively narrow location between the wound portion of the coil and the inner core portion of the magnetic core.

It can be said that if at least a portion of the relatively narrow location is provided at a location corresponding to the following heat dissipation location on the outer peripheral surface of the wound portion, the distance from the inner core portion to the heat dissipation location of the wound portion is short. This kind of reactor of the present disclosure can efficiently dissipate heat from the inner core portion to the wound portion. Examples of the heat dissipation location of the wound portion include a location with which a fluid coolant such as the above-described liquid refrigerant can come into direct contact, and a location that is arranged near the above-described installation target or the cooling mechanism in the wound portion.

The reactor of the present disclosure satisfies a predetermined condition that (interval t1/heat dissipation rate λ1) is smaller than (interval t2/heat dissipation rate λ2) regarding the heat dissipation rate of an interposing member that is present between the wound portion and the inner core portion, and the interval of the location at which the interposed member is arranged.

For example, if the constituent material of the electrically insulating material and the constituent material of the thick portion are the same, the thermal conductivities λ1 and λ2 are substantially equal. However, the interval t1 is smaller than the interval t2. That is, due to the distance from the inner core portion to the heat dissipation surface of the wound portion being short as described above, the reactor of the present disclosure has an excellent heat dissipation property.

On the other hand, a case will be described in which the constituent material of the electrically insulating material and the constituent material of the thick portion are different from each other.

For example, if the thermal conductivity λ1 of the electrically insulating material is greater than the thermal conductivity λ2 of the thick portion, the electrically insulating material has a more excellent thermal conductivity than the thick portion. This kind of reactor of the present disclosure has a more excellent heat dissipation property due to both the magnitude relationship of the thermal conductivities and the magnitude relationship of the intervals t1 and t2. Note that in this case, (interval t1/thermal conductivity λ1) is reliably smaller than (interval t2/thermal conductivity λ2).

Alternatively, for example, it is conceivable that the thermal conductivity λ1 of the electrically insulating material is smaller than the thermal conductivity λ2 of the thick portion. However, it can be said that if the interval t1 is much smaller than the interval t2, heat is likely to be transmitted from the inner core portion to the wound portion, even if the electrically insulating material is interposed between the inner core portion and the wound portion. Because of this, (interval t1/thermal conductivity λ1) being smaller than (interval t2/thermal conductivity λ2) can be said to be one configuration with an excellent heat dissipation property. In view of this, as one configuration with an excellent heat dissipation property, the reactor of the present disclosure envisions a magnitude relationship between the proportions of the thermal conductivity of the material interposed between the wound portion and the inner core portion and the interval of the location at which the material is arranged.

Also, the reactor of the present disclosure has excellent manufacturability due to the following reasons. In the process of manufacturing the reactor of the present disclosure, the resin molded portion is formed as follows. A fluid resin that is a raw material for the resin molded portion fills at least a portion of the space between the wound portion and the inner core portion, and is thereafter solidified. The space includes a location with a relatively wide interval as a location for forming the thick portion. For this reason, the fluid resin easily fills the space. Consequently, the resin molded portion is easily formed.

If the electrically insulating material is a molded object that is constituted by a material different from that of the thick portion and is independent of the resin molded portion, the resin molded portion is more easily formed. This kind of reactor has a more excellent manufacturability. This is because the filling with the fluid resin need only be performed in a state in which the electrically insulating material is arranged in at least a portion of the narrowest location of the space. The fluid resin does not need to fill the region of the space in which the electrically insulating material is present. The location at which the electrically insulating material is not arranged in the above-described space, that is, the relatively wide location, need only be filled with the fluid resin. For this reason, the fluid resin easily fills the space. Also, the fluid resin easily fills the space accurately and with no intervals.

Furthermore, the reactor of the present disclosure also has excellent strength for the following reasons. The magnetic core included in the reactor of the present disclosure is held in one piece by the resin molded portion including the inner resin portion and the outer resin portion. The resin molded portion easily improves the strength of the connection between the inner resin portion and the outer resin portion using the thick portion. Due to being held by this kind of resin molded portion, the magnetic core can improve its rigidity as an integral object.

In addition, the reactor of the present disclosure can achieve mechanical protection of the magnetic core, protection from the external environment, an improvement in electrical insulation from the coil, and the like using the resin molded portion.

As one example of a reactor of the present disclosure, a mode is given in which the reactor includes a thin portion that is interposed in at least a portion of the location at which the interval between the wound portion and the inner core portion is relatively narrow, the thin portion forming another portion of the inner resin portion.

The above-described mode has a more excellent heat dissipation property due to the following reasons. In the above-described mode, a portion (thin portion) of the resin molded portion is included at the relatively narrow location. The thermal conductivity of the thin portion is higher than that of the air. For this reason, the above-described mode easily improves the heat dissipation property compared to the case where air is included in the relatively narrow location.

As one example of the reactor according to (2), a mode is given in which the electrically insulating material and the thin portion are included at the location at which the interval between the wound portion and the inner core portion is relatively narrow.

The electrically insulating material of the above-described mode is formed independently of the resin molded portion. In the mode including this kind of electrically insulating material, the resin molded portion is easily formed as described above, and thus excellent manufacturability is achieved. In particular, the mode in which the thermal conductivity λ1 of the electrically insulating material is higher than the thermal conductivity λ2 of the thick portion has a more excellent heat dissipation property.

Also, in the above-described mode, the appearance of cracks or the like in the inner resin portion due to thermal stress or the like is easily prevented and an excellent mechanical strength is achieved due to the following reasons. The inner resin portion included in the above-described mode is not a ring-shaped member that is continuous in the peripheral direction of the wound portion in a cross-section (hereinafter referred to as a lateral cross-sectional) obtained by cutting the reactor with a plane that is orthogonal to the axial direction of the wound portion. The inner resin portion is a C shape that includes a boundary with the electrically insulating material in the above-described lateral cross-section, and the electrically insulating material is typically used as a break. This kind of inner resin portion can elastically deform to a certain extent, and thus stress is easily released. For this reason, the inner resin portion is not likely to crack due to the thermal stress or the like.

As one example of a reactor of the present disclosure, a mode is given in which the interval t1 of the narrowest location is 50% or less of the interval t2 of the widest location.

In the above-described mode, the interval t1 of the narrowest location is very small compared to the interval t2. For this reason, even if the thermal conductivity λ1 is slightly small, (interval t1/thermal conductivity λ1) is likely to decrease. In the above-described mode, (interval t1/thermal conductivity λ1) is reliably smaller than (interval t2/thermal conductivity λ2) if the thermal conductivity λ1 has a magnitude that is more than half of the thermal conductivity λ2. This kind of mode has a more excellent heat dissipation property. Also, in the above-described mode, it is easy to ensure a wider interval t2 of the widest location. In this kind of mode, filling with the fluid resin is more easily performed in the manufacturing process as described above, and a more excellent manufacturability is achieved.

As one example of a reactor of the present disclosure, a mode is given in which the wound portion has a quadrangular tube shape and the inner core portion has a quadrangular column shape, and the location at which the interval between the wound portion and the inner core portion is relatively narrow includes a flat plate-shaped location that is interposed between a surface of an inner peripheral surface of the wound portion and a surface of an outer peripheral surface of the inner core portion.

In the above-described mode, the region in which the distance from the above-described inner core portion to the heat dissipation location of the wound portion is short is a flat plate-shaped region, and therefore it can be said that the region is relatively wide. This kind of mode has a more excellent heat dissipation property. The mode in which the electrically insulating material formed independently of the resin molded portion is interposed in the flat plate-shaped region also has excellent manufacturability as described above. In particular, the mode in which the thermal conductivity λ1 of the electrically insulating material is higher than the thermal conductivity λ2 of the thick portion has a more excellent heat dissipation property.

As one example of a reactor of the present disclosure, a mode is given in which the thermal conductivity λ1 of the electrically insulating material is higher than the thermal conductivity λ2 of the thick portion.

Due to the thermal conductivity λ1 of the electrically insulating material being higher than the thermal conductivity λ2 of the thick portion, in the above-described mode, (interval t1/thermal conductivity λ1) is reliably smaller than (interval t2/thermal conductivity λ2). This kind of mode has a more excellent heat dissipation property.

As one example of a reactor of the present disclosure, a mode is given in which the electrically insulating material includes at least one of insulating paper and insulating film.

In general, the insulating paper and the insulating film are very thin. For this reason, in the above-described mode, the interval t1 of the location at which the insulating paper or the insulating film is arranged can be made smaller. Consequently, (interval t1/thermal conductivity λ1) can be made smaller. Accordingly, the above-described mode has a more excellent heat dissipation property. Also, in the above-described mode, it is easy to ensure a wider interval t2 of the widest location. For this reason, in the above-described mode, filling with the fluid resin is more easily performed in the manufacturing process as described above, and more excellent manufacturability is achieved. Furthermore, the above-described mode also has excellent electrical insulation between the wound portion and the inner core portion. This is because although the interval t1 is small, the insulating. paper or the insulating film is interposed therebetween instead of air.

As one example of a reactor of the present disclosure, a mode is given in which the electrically insulating material includes a molded body including a resin that is the same as a constituent resin of the inner resin portion.

The electrically insulating material included in the above-described mode includes a resin that is the same as that of the inner resin portion. For this reason, the thermal conductivity λ1 is close to or substantially equal to the thermal conductivity λ2. However, since the interval t1 is smaller than the interval t2 as described above, the above-described mode has an excellent heat dissipation property. Also, the thermal expansion coefficient of the above-described electrically insulating material is close to or substantially equal to the thermal expansion coefficient of the inner resin portion. Accordingly, in the above-described mode, deformation, cracking, and the like of the inner resin portion resulting from a difference in the thermal expansion coefficient is not likely to occur, and thus a more excellent mechanical strength is achieved. Furthermore, the electrically insulating material is molded independently of the resin molded portion. For this reason, in the above-described mode, the resin molded portion is easily formed as described above, and thus an excellent manufacturability is also achieved.

Hereinafter, embodiments of the present disclosure will be described in detail with reference to the drawings. Objects with the same names are denoted by the same reference numerals in the drawings.

First Embodiment

A reactor 1 of a first embodiment will be described mainly with reference to FIGS. 1 to 3.

Figure 2A:
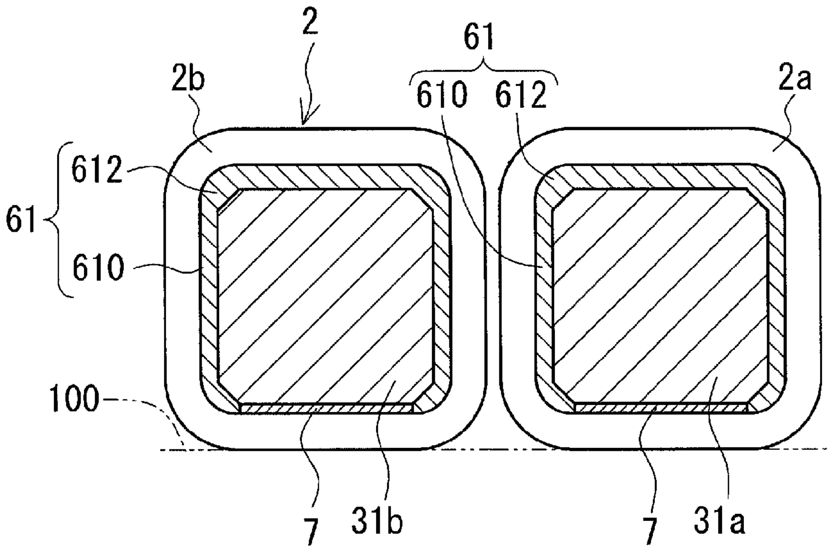
FIG. 2A is a cross-sectional view obtained by cutting the reactor of the first embodiment along a cutting line (II)-(II) shown in FIG. 1.
Figure 4A:
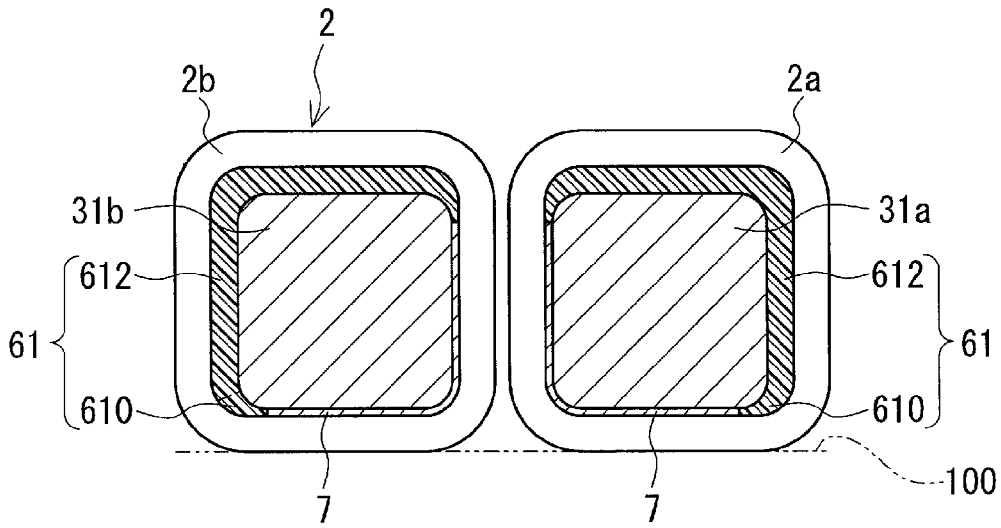
FIG. 4A is a cross-sectional view obtained by cutting a reactor according to a second embodiment with a plane orthogonal to an axial direction of a wound portion.
Figure 5:
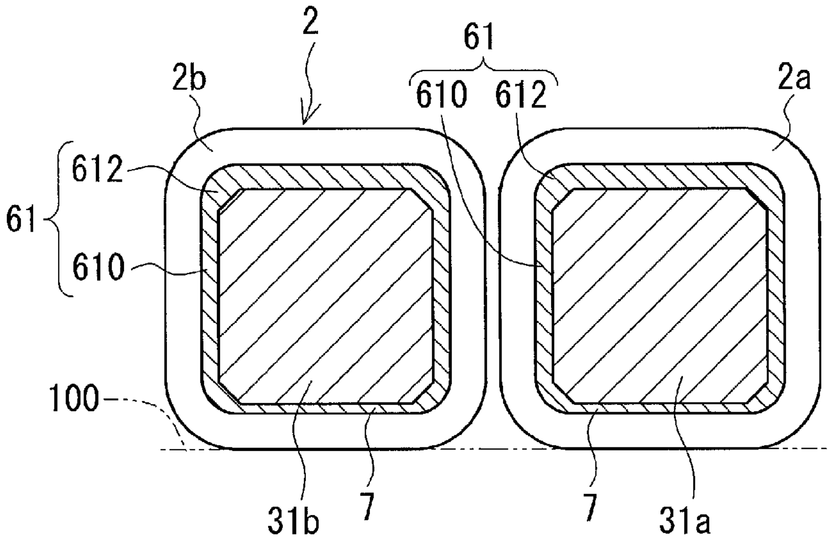
FIG. 5 is a cross-sectional view obtained by cutting a reactor according to a third embodiment with a plane orthogonal to an axial direction of a wound portion.

FIG. 2A is a lateral cross-sectional view obtained by cutting the reactor 1 with a plane orthogonal to an axial direction of a coil 2. FIG. 2A shows only wound portions 2*a* and 2*b* of the coil 2, inner core portions 31*a* and 31*b*, electrically insulating materials 7, and inner resin portions 61. FIGS. 4A and 5, which will be described later, are similar in this respect.

Figure 2B:
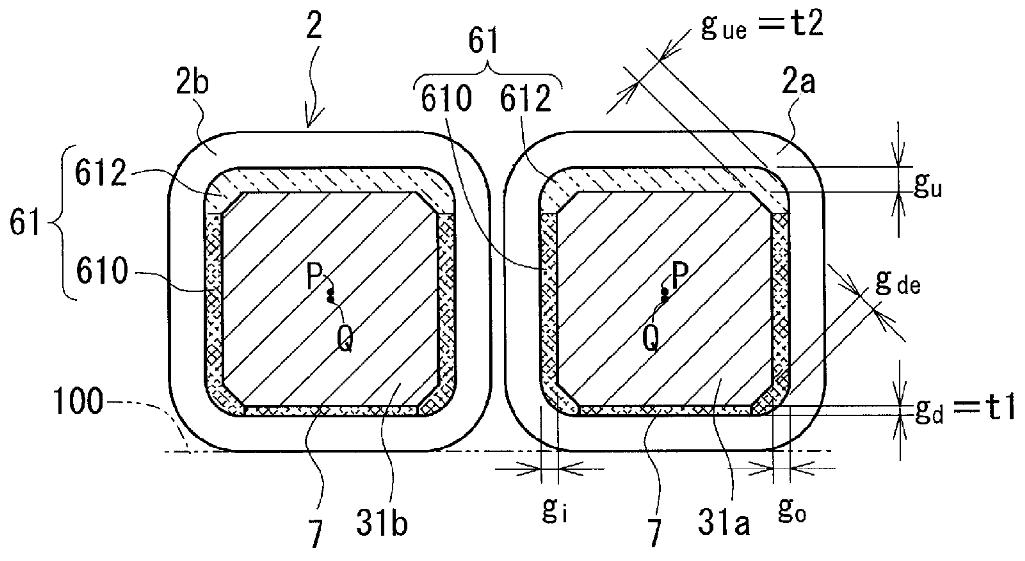
FIG. 2B is a diagram illustrating an interval between a wound portion and an inner core portion in the reactor shown in FIG. 2A.

FIG. 2B is an illustrative diagram using the same drawing as FIG. 2A. FIG. 2B is a diagram for illustrating an interval between the wound portion 2*a* and the inner core portion 31*a*, and an interval between the wound portion 2*b* and the inner core portion 31*b*.

In the following description, the lower portions of FIGS. 1, 2, 4, and 5 are the installation side of the reactor 1. The installation direction is an example and can be changed as needed.

Also, in the following description, an installation target 100 side is referred to as a lower side, and a side opposite to the installation target 100 is referred to as an upper side in some cases. The sides at which the wound portions 2*a* and 2*b* are near each other are referred to as inner sides, and the sides at which the wound portions 2*a* and 2*b* are spaced apart from each other are referred to as outer sides in some cases.

Reactor

Overview

As shown in FIG. 1, the reactor 1 of the first embodiment includes a coil 2 having wound portions, a magnetic core 3 that is arranged inside and outside of the wound portions, and a resin molded portion 6 that covers at least a portion of the magnetic core 3. The coil 2 of the present example includes the pair of wound portions 2*a* and 2*b*. The wound portions 2*a* and 2*b* are arranged side by side such that their axes are parallel. The magnetic core 3 includes inner core portions 31*a* and 31*b* that are respectively arranged in the wound portions 2*a* and 2*b*, and two outer core portions 32 that are arranged outside of the wound portions 2*a* and 2*b*. The two outer core portions 32 are arranged so as to sandwich the inner core portions 31*a* and 31*b* that are arranged side by side. Due to this arrangement, the magnetic core 3 forms a ring-shaped closed magnetic path. The resin molded portion 6 includes inner resin portions 61 (see also FIG. 2A) and outer resin portions 62. One inner resin portion 61 fills at least a portion between one wound portion 2*a* and one inner core portion 31*a*. The other inner resin portion 61 fills at least a portion between the other wound portion 2*b* and the other inner core portion 31*b*. The outer resin portions 62 cover at least portions of the outer core portions 32. The resin molded portion 6 exposes the outer peripheral surfaces of the wound portions 2*a* and 2*b* without covering them. This kind of reactor 1 is typically used by being attached to an installation target 100 (FIG. 2A) such as a converter case.

In the reactor 1 of the first embodiment, as shown in FIG. 2A, the interval between the wound portion 2*a* and the inner core portion 31*a* differs in the peripheral direction of the wound portion 2*a*. Also, the interval between the wound portion 2*b* and the inner core portion 31*b* differs in the peripheral direction of the wound portion 2*b*. In the reactor 1 of the present example, the shape of the space created by the wound portion 2*a* and the inner core portion 31*a* and the interval therebetween are substantially equal to the shape of the space created by the wound portion 2*b* and the inner core portion 31*b* and the interval therebetween. The above-described spaces are tube-shaped spaces. Also, the spaces satisfy interval $g_d$<intervals $g_i$ and $g_o$<interval $g_{de}$<interval $g_u$<interval $g_{ue}$ (FIG. 2B).

Furthermore, in the reactor 1 of the first embodiment, the following specific conditions are satisfied in the interposed object that is present at the location at which the interval is the narrowest and the interposed object that exists at the location at which the interval is the widest, in the intervals between the above-described wound portions 2*a* and 2*b* and the inner core portions 31*a* and 31*b*. Specifically, the reactor 1 includes the electrically insulating material 7 that is interposed in a location at which the interval is the narrowest, and a thick portion 612 that is interposed at a location at which the interval is the widest. The thick portion 612 forms a portion of the inner resin portion 61.

The thermal conductivity of the electrically insulating material 7 is λ1.

The interval of the narrowest location (in the present example, interval $g_d$) is t1.

The proportion of the interval t1 with respect to the thermal conductivity λ1 is (interval t1/thermal conductivity λ1).

The thermal conductivity of the thick portion 612 is λ2.

The interval of the widest location (in the present example, interval $g_{ue}$) is t2.

The proportion of the interval t2 with respect to the thermal conductivity λ2 is (interval t2/thermal conductivity λ2).

The reactor 1 satisfies (interval t1/thermal conductivity λ1)<(interval t2/thermal conductivity λ2). Hereinafter, each constituent element will be described in detail.

Coil

The coil 2 of the present example includes tube-shaped wound portions 2*a* and 2*b* that are formed by winding winding wires into spiral shapes. The following mode is given as a coil 2 including a pair of wound portions 2*a* and 2*b* that are arranged side by side.

The coil 2 includes the wound portions 2*a* and 2*b* that are formed by two independent winding wires 2*w* and the following connection portion (the present example, FIG. 1). The connection portion connects the end portions on one side of the two end portions of the winding wires 2*w* pulled out from the winding portions 2*a* and 2*b*.

The coil 2 includes the wound portions 2*a* and 2*b* that are formed from one continuous winding wire, and a joining portion that joins the wound portions 2*a* and 2*b*. The joining portion is composed of a portion of the winding wire spanning between the wound portions 2*a* and 2*b*.

In both coils 2, end portions (in (i), the other end portions that are not used in the connection portion) of the winding wires pulled out from the wound portions 2*a* and 2*b* are used as locations to which an external apparatus such as a power source is connected. Examples of the connection portion of mode (i) include a mode in which the end portions of the winding wires 2*w* are directly connected to each other, and a mode in which the end portions of the winding wires 2*w* are indirectly connected to each other. Welding, crimping, or the like can be used in the direct connection. Suitable metal fittings or the like that are attached to the end portions of the winding wires 2*w* can be used in the indirect connection.

Examples of the winding wires 2*w* include covered wires that include conductor wires and insulating coverings that cover the outer peripheries of the conductor wires. Examples of the constituent material of the conductor wires include copper. Examples of the constituent material of the insulating coverings include resins such as polyamide imide. The wound portions 2*a* and 2*b* of the present example are square tube-shaped edgewise coils formed by winding winding wires 2*w* composed of covered flat wires in an edgewise manner. Also, specifications such as the shapes, winding directions, and numbers of turns of the wound portions 2*a* and 2*b* of the present example are identical. Edgewise coils easily improve the space factor, and thus it is possible to achieve a coil 2 with a smaller size. Also, due to having square tube shapes, the outer peripheral surfaces of the wound portions 2*a* and 2*b* can include four rectangular flat surfaces. If one of the four flat surfaces is, for example, an installation surface, the distances from the installation surfaces of the wound portions 2*a* and 2*b* to the installation target 100 will be of a uniform size (FIG. 2A). Alternatively, if the one surface is arranged near, for example, a cooling mechanism, the distance from the one surface to the cooling mechanism will be of a uniform size. For this reason, the wound portions 2*a* and 2*b* can dissipate heat efficiently to the installation target 100 and the cooling mechanism.

Note that the shapes, sizes, and the like of the winding wires 2*w* and the wound portions 2*a* and 2*b* can be changed as appropriate. For example, the winding wires may also be covered round wires. Alternatively, for example, the shapes of the wound portions 2*a* and 2*b* may also be tube shapes that do not have corner portions, such as circular tube shapes or racetrack tube shapes. The specifications of the wound portions 2*a* and 2*b* may also be different.

In the reactor 1 of the first embodiment, the entireties of the outer peripheral surfaces of the wound portions 2*a* and 2*b* are exposed without being covered by the resin molded portion 6. The inner resin portions 61, which are portions of the resin molded portion 6, are present in the wound portions 2*a* and 2*b*. At least portions of the inner peripheral surfaces of the wound portions 2*a* and 2*b* are covered by the resin molded portion 6.

Magnetic Core

The magnetic core 3 of the present example includes two column-shaped inner core portions 31*a* and 31*b* and two column-shaped outer core portions 32. Furthermore, the magnetic core 3 of the present example includes a gap material (not shown) between end surfaces 31*e* (FIG. 3) of the inner core portions 31*a* and 31*b* and joining surfaces 32*e* (FIG. 3) of the outer core portions 32. The gap material is composed of the constituent resin of the resin molded portion 6.

Core Pieces

Figure 3:
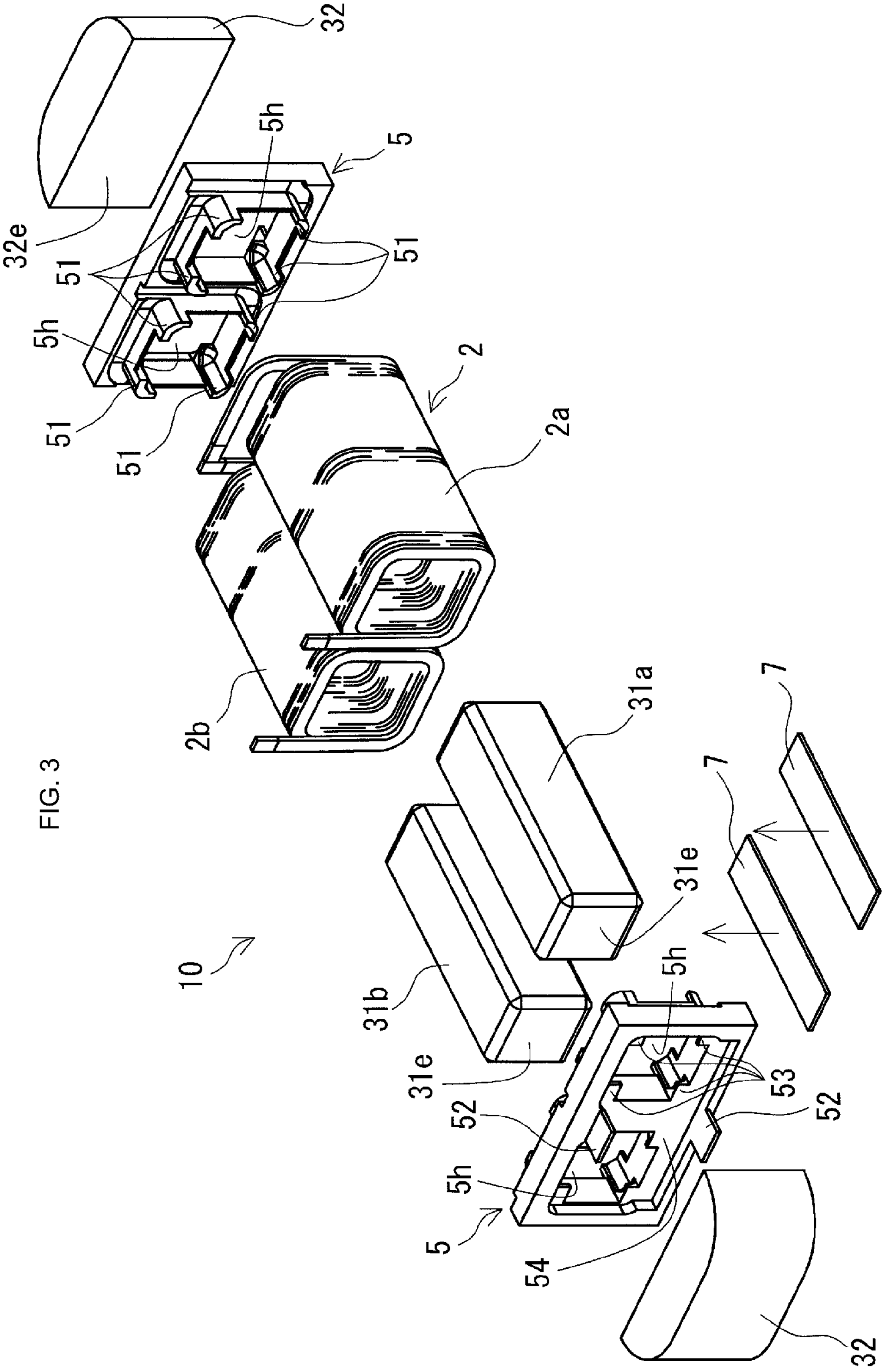
FIG. 3 is an exploded perspective view showing a combined body included in the reactor according to the first embodiment.

As shown in FIG. 3, the inner core portions 31*a* and 31*b* of the present example are each composed of one column-shaped core piece. The core pieces have the same shape and the same size. Also, the core pieces have cuboid shapes with rectangular end surfaces 31*e*. The outer peripheral shape of each core piece is approximately analogous to the inner peripheral shapes of the wound portions 2*a* and 2*b*. The corner portions of each core piece have been C chamfered. For this reason, the corner portions of the core pieces are not likely to be missing. This kind of core piece has excellent strength. The corner portions of each core piece may also be R beveled (see later-described FIG. 4A).

The outer core portions 32 of the present example are each composed of one column-shaped core piece. The core pieces have the same shape and the same size. The core pieces are columnar members obtained by R beveling two corner portions of a cuboid member. The shapes of surface on the installation target 100 side of each core piece and the opposing surface (in FIG. 3, the upper surface and the lower surface) are dome-shaped. The joining surface 32*e* at which the inner core portions 31*a* and the 31*b* of the core pieces are connected is a rectangular flat surface. Also, the core pieces have a size such that the lower surfaces of the core pieces protrude past the lower surfaces of the inner core portions 31*a* and 31*b* in a state in which the inner core portions 31*a* and 31*b* are joined. The magnetic path of the outer core portion 32 can be increased due to this protrusion. As a result, the size of the reactor 1 along the axial directions of the wound portions 2*a* and 2*b* is easily reduced. In this respect, it is possible to achieve a more compact reactor 1.

The shapes, sizes, and the like of the inner core portions 31*a* and 31*b* and the outer core portions 32 can be changed as appropriate (see later-described modified examples 4 and 5).

In the present example, as shown in FIG. 2B, the axes Q of the inner core portions 31*a* and 31*b* are misaligned with respect to the axes P of the wound portions 2*a* and 2*b*. Even if the wound portions 2*a* and 2*b* and the inner core portions 31*a* and 31*b* have approximately analogous shapes as in the present example, if the amount by which the axes Q are misaligned with respect to the axes P is set, the intervals between the wound portions 2*a* and 2*b* and the inner core portions 31*a* and 31*b* can be made different in the peripheral directions of the wound portions 2*a* and 2*b*. The above-described misalignment amount may be adjusted such that the intervals fall within a desired range. The details of the intervals will be described later.

Constituent Material

The above-described core pieces are, for example, molded bodies mainly composed of a soft magnetic material. Examples of a soft material include metals such as iron or an iron alloy (e.g., Fe—Si alloy, Fe—Ni alloy, etc.), and non-metals such as ferrite. Examples of the above-described molded body include a pressed powder molded body, a molded body of a composite material, a layered body of plates composed of a soft magnetic material, and a sintered body. A pressed powder molded body is obtained by compression-molding a powder composed of a soft magnetic material and a covering powder or the like including an insulating covering. The molded body of the composite material is obtained by solidifying a fluid mixture including a soft magnetic powder and a resin. The layered body is obtained by stacking plate materials such as electromagnetic steel plates. Examples of the sintered body include a ferrite core. It is possible to use either a mode in which the constituent materials of the inner core portions 31*a* and 31*b* and the constituent materials of the outer core portions 32 are the same or a mode in which they are different.

The magnetic core 3 may also include a gap material as in the present example. A solid body such as a plate material or an air interval can be used as a gap material. Examples of constituent materials of the solid body include, in addition to the constituent resin of the resin molded portion 6 as in the present example, a non-magnetic material such as alumina, or a molded body that includes a magnetic material and has a lower relative permeability than the above-described core piece. Note that the gap material may also be omitted.

Interval Between Wound Portion and Inner Core Portion

Hereinafter, intervals between the wound portions 2*a* and 2*b* and the inner core portions 31*a* and 31*b* will be described mainly with reference to FIG. 2B.

In the present example, subject matter relating to the interval between one wound portion 2*a* of the coil 2 and one inner core portion 31*a* of the magnetic core 3 is substantially the same regarding the interval between the other wound portion 2*b* and the inner core portion 31*b*. For this reason, hereinafter, the wound portion 2*a* and the inner core portion 31*a* will be described as examples. Note that the interval and the later-described interposed object between the wound portion 2*a* and the inner core portion 31*a* can also be made different from the interval and the later-described interposed object between the wound portion 2*b* and the inner core portion 31*b*.

The interval between the wound portion 2*a* and the inner core portion 31*a* in this context is the distance between the inner peripheral surface of the wound portion 2*a* and the outer peripheral surface of the inner core portion 31*a*.

In the present example, the inner peripheral shape of the wound portion 2*a* and the outer peripheral shape of the inner core portion 31*a* are approximately analogous as described above. However, as shown in FIG. 2B, the axis Q of the inner core portion 31*a* is not coaxial with the axis P of the wound portion 2*a* but is misaligned with respect thereto. Specifically, in the present example, the axis Q of the inner core portion 31*a* is arranged misaligned toward the installation target 100 side (lower side) from the state in which the axis P and the axis Q are arranged coaxially. In a sense, the inner core portion 31*a* is arranged eccentrically toward the installation target 100 side. For this reason, in the reactor 1, a location at which the interval between the wound portion 2*a* and the inner core portion 31*a* is relatively wide and a location at which the interval is relatively narrow are present. In the present example, the interval toward the installation target 100 side (lower side) is relatively narrow. Also, in the present example, the interval toward the side opposite to the installation target 100 (upper side) is relatively large. The interval toward the installation target 100 is smaller than the interval on the side opposite to the installation target 100.

In the above-described arrangement state, the interval between the corner portion on the side opposite to the installation target 100 (upper side) on the inner peripheral surface of the wound portion 2*a* and the corner portion on the upper side of the inner core portion 31*a* is $g_{ue}$.

The interval between the upper surface of the inner peripheral surface of the wound portion 2*a* and the upper surface of the inner core portion 31*a* is $g_u$.

The interval between the lower surface of the inner peripheral surface of the wound portion 2*a* and the lower surface of the inner core portion 31*a* is $g_d$.

The interval between the corner portion on the lower side of the inner peripheral surface of the wound portion 2*a* and the corner portion on the lower side of the inner core portion 31*a* is $g_{de}$.

The interval between the left surface of the inner peripheral surface of the wound portion 2*a* and the left surface of the inner core portion 31*a*, that is, the interval on the inner side, is $g_i$.

The interval between the right surface of the inner peripheral surface of the wound portion 2*a* and the right surface of the inner core portion 31*a*, that is, the interval on the outer side, is $g_o$.

The interval $g_{ue}$ is the largest.

The interval $g_d$ is the smallest.

Also, the sizes of the intervals are, in ascending order, intervals $g_i$ and $g_o$, interval $g_{de}$, and interval $g_u$. That is, the reactor 1 satisfies interval $g_d$<intervals $g_i$ and $g_o$<interval $g_{de}$<interval $g_u$<interval $g_{ue}$.

Quantitatively, the reactor 1 of the present example satisfies the following, using the interval $g_{ue}$, which is the maximum value of the interval between the wound portion 2*a* and the inner core portion 31*a*, as a reference.

The interval $g_u$ is 80% or more and less than 100% of the interval $g_{ue}$.

The interval $g_{de}$ is 70% or less of the interval $g_{ue}$.

The intervals $g_i$ and $g_o$ are each 60% or less of the interval $g_{ue}$. The intervals $g_i$ and $g_o$ are equal to each other.

The interval $g_d$, which is the minimum value of the above-described interval, is 40% or less of the interval $g_{ue}$.

Here, in the region between the wound portion 2*a* and the inner core portion 31*a*, a region that is 70% or less of the maximum value (in the present example, the interval $g_{ue}$) of the interval between the wound portion 2*a* and the inner core portion 31*a* is referred to as a location at which the interval is relatively narrow. A region that is greater than 70% of the maximum value of the interval is referred to as a location at which the interval is relatively wide. FIG. 2B virtually shows a location at which the interval is relatively narrow by adding cross-hatching using two-dot chain lines to the location at which the interval is relatively narrow in the region between the wound portions 2*a* and 2*b* and the inner core portions 31*a* and 31*b*. Also, in FIG. 2B, the location at which the interval is relatively wide is denoted virtually by adding hatching using two-dot chain lines to the location at which the interval is relatively wide. In the present example, the location at which the interval is relatively narrow is a U-shaped region having the intervals $g_d$, $g_i$, $g_o$, and $g_{de}$ (see the cross-hatched region).

The location at which the above-described interval is relatively narrow contributes to shortening the distance from the inner core portion 31*a* to the wound portion 2*a*. In the present example, the distance from the surface (lower surface) on the installation target 100 side of the inner core portion 31*a* to the surface (lower surface) on the installation target 100 side of the outer peripheral surface of the wound portion 2*a* can be made shorter compared to the case where the wound portion 2*a* and the inner core portion 31*a* are arranged coaxially. For this reason, the reactor 1 of the present example can dissipate heat efficiently from the inner core portion 31*a*, through the wound portion 2*a*, and to the installation target 100. Alternatively, in the present example, the distance from the right surface of the inner core portion 31*a* to the right surface of the outer peripheral surface of the wound portion 2*a* can be made shorter than the distance from the upper surface of the inner core portion 31*a* to the upper surface of the wound portion 2*a*. For this reason, if the cooling mechanism is brought close to the right surface of the outer peripheral surface of the wound portion 2*a*, for example, the reactor 1 can efficiently dissipate heat from the right surface of the inner core portion 31*a*, through the wound portion 2*a*, to the cooling mechanism. The reactor 1 can thus shorten the distance from the inner core portion 31*a* to the heat dissipation location (here, the lower surface and right surface) of the wound portion 2*a*.

The smaller the size (interval) of the above-described relatively narrow location is, the more the distance from the above-described inner core portion 31*a* to the heat dissipation location of the wound portion 2*a* can be shortened. In this respect, the reactor 1 has an excellent heat dissipation property. Also, the smaller the interval of the above-described relatively narrow location is, the easier it is to ensure a large interval of the relatively wide location. In this respect, the resin molded portion 6 is easy to manufacture, and the reactor 1 has an excellent manufacturability (described in detail later). If an improvement in the heat dissipation property, an improvement in the manufacturability, and the like are desired, the interval of the relatively narrow location is preferably 65% or less, and more preferably 60% or less, 55% or less, or 50% or less of the maximum value of the above-described interval.

It is preferable that the interval t1 (here, the interval $g_d$) of the narrowest location of the interval between the wound portion 2*a* and the inner core portion 31*a* is 50% or less of the interval t2 (here, the interval $g_{ue}$) of the widest location. This is because the distance from the above-described upper core portion 31*a* to the heat dissipation location of the wound portion 2*a* is shorter and thus the heat dissipation property is more excellent. Also, it is easier to ensure a wider interval t2 of the widest location. For this reason, the resin molded portion 6 is easy to manufacture, and the reactor 1 has more excellent manufacturability. If an improvement in the heat dissipation property, an improvement in manufacturability, and the like are desired, the interval t1 of the narrowest location is preferably 45% or less, or more preferably 40% or less, or 35% or less of the maximum value of the interval.

From the viewpoint of improving the heat dissipation property and improving manufacturability, the interval t1 of the narrowest location may also be substantially zero. However, in this case, from the viewpoint of ensuring electrical insulation between the wound portion 2*a* and the inner core portion 31*a*, it is preferably that the electrical insulation is ensured by the coil 2 due to the winding wires 2*w* including insulating coverings, or the like. Also, in this case, it is preferable that there is no risk of damaging the coil 2 and the like due to vibration or the like during use of the reactor 1.

If an improvement in the electrical insulation between the wound portion 2*a* and the inner core portion 31*a* or the like is desired, the interval t1 of the narrowest location may be 5% or more, or furthermore 10% or more of the maximum value of the interval.

In the present example, the location at which the interval is the narrowest is a flat plate-shaped location. The interval $g_d$ of the flat plate-shaped location is 5% or more and 50% or less of the maximum value of the interval.

The greater the percentage occupied by the location at which the interval is relatively narrow in the region between the wound portion 2*a* and the inner core portion 31*a* is, the more excellent the heat dissipation property is. This is because the number of regions in which the distance from the above-described inner core portion 31*a* to the heat dissipation location of the wound portion 2*a* is short increases. Examples of modes in which the above-described occupation percentage is great includes a case in which the percentage of the length of the location at which the interval is relatively narrow (hereinafter referred to as "length percentage") with respect to the inner peripheral length of the wound portion 2*a* is 10% or more. The length of the location at which the interval is relatively narrow is the length along the peripheral direction of the wound portion 2*a*. The greater the length percentage is, the more regions there are in which the distance to the above-described heat dissipation location is short. In this respect, the reactor 1 easily improves the heat dissipation property. If an improvement in the heat dissipation property is desired, it is preferable that the above-described length percentage is 15% or more. In the present example, the length percentage is 50% or more, and furthermore 65% or more. For this reason, it can be said that the reactor 1 of the present example includes many regions in which the interval is relatively narrow. On the other hand, if the length percentage is, for example, 90% or less, a location in which the interval is relatively wide reliably exists. Consequently, the thick portion 612 reliably exists. If an increase in the presence percentage of the thick portion 612 or the like is desired, the length percentage may also be 85% or less, and furthermore 80% or less. In addition, in the present example, the percentage of the length of the location at which the interval is the widest with respect to the inner peripheral length of the wound portion 2*a* is 15% or more.

Other examples of a mode in which the above-described occupation percentage is high include a case in which the location at which the interval is relatively narrow includes the following flat plate-shaped location as in the present example. Specifically, the wound portion 2*a* has a quadrangular tube shape. The inner core portion 31*a* has a quadrangular column shape. The flat plate-shaped location is a location that is sandwiched between one surface (here, the surface on the installation target 100 side (lower surface)) of the inner peripheral surface of the wound portion 2*a* and one surface (lower surface) of the outer peripheral surface of the inner core portion 31*a*. The flat plate-shaped location has a surface area that is approximately equal to that of the lower surface of the wound portion 2*a*. For this reason, it can be said that this mode has a very high number of regions in which the distance from the above-described inner core portion 31*a* to the heat dissipation location of the wound portion 2*a* is short. In this respect, the reactor 1 easily improves the heat dissipation property. Also, in the present example, the interval $g_d$ of the flat plate-shaped location is 40% or less of the maximum value of the interval, and is half or less of the maximum value of the interval. In this respect as well, the reactor 1 easily improves the heat dissipation property.

Interposed Member

The reactor 1 of the present example includes the interposed member 5. The interposed members 5 are interposed between the wound portions 2*a* and 2*b* of the coil 2 and the magnetic core 3. The interposed members 5 of the present example are typically composed of an electrically insulating material, and contribute to improving the electrical insulation between the coil 2 and the magnetic core 3. The interposed members 5 contribute also to positioning the magnetic core with respect to the wound portions 2*a* and 2*b*. Furthermore, in the manufacturing process of the reactor 1, the interposed members 5 of the present example contribute also to forming predetermined intervals between the wound portions 2*a* and 2*b* and the inner core portions 31*a* and 31*b*, between the inner core portions 31*a* and 31*b* and the outer core portions 32, and the like. This interval is used as a flow path of the fluid resin. The fluid resin filling the interval is solidified to form the resin molded portion 6.

Specifically, the interposed member 5 of the present example is a frame-shaped plate member as shown in FIG. 3 and is arranged between the end surfaces of the wound portions 2*a* and 2*b* and the joining surfaces 32*e* of the outer core portions 32 (see also FIG. 1). In the plate material, two through holes 5*h* are provided side by side in a direction orthogonal to the axial directions of the wound portions 2*a* and 2*b*. Multiple support pieces 51 are provided toward the wound portions 2*a* and 2*b* in the plate material. The support pieces 51 position the inner core portions 31*a* and 31*b*. The plate material includes the multiple support pieces and recessed portions 54 toward the outer core portions 32. The support pieces 52 prevent misalignment of the outer core portions 32. The outer core portions 32 are fit into the recessed portions 54. The support pieces 51 and 52 are omitted in FIG. 1.

The through holes 5*h* of the present example are holes that are plus-shaped in a view in their axial directions. Specifically, the through holes 5*h* have plus shapes due to the four corners of each square-shaped hole being covered by flat plate-shaped end surface support portions 53. In the state in which the inner core portions 31*a* and 31*b* and the interposed member 5 are assembled, the four corner portions of each of the end surfaces 31*e* of the inner core portions 31*a* and 31*b* are covered by the end surface support portions 53. Locations other than the four corner portions of each of the end surfaces 31*e* are exposed from the through holes 5*h*. A predetermined interval is formed between the outer peripheral surface of the inner core portions 31*a* and 31*b* and the opening edges of the through holes 5*h*. This interval is used as a flow path of the above-described fluid resin. Also, in the above-described assembled state, the end surface support portions 53 are interposed between the end surfaces 31*e* of the inner core portions 31*a* and 31*b* and the joining surfaces 32*e* of the outer core portions 32. Due to this interposition, intervals corresponding to the thickness of the end surface support portions 53 are formed between the end surfaces 31*e* and the joining surfaces 32*e*. These intervals are used as locations for forming gaps composed of the constituent resin of the resin molded portion 6. The thickness of end surface support portions 53 is adjusted according to the gap length.

The interposed member 5 includes multiple support pieces 51 (eight support pieces 51 in total). Each support piece 51 protrudes toward the wound portion 2*a* or 2*b* from a corner portion near the opening edge of a through hole 5*h*. Four support pieces 51 protrude from the corner portions near one opening edge. The support pieces 51 are rod-shaped members that extend along the axial directions of the wound portions 2*a* and 2*b*. The inner peripheral surfaces of the support pieces 51 have shapes that correspond to the corner portions of the outer peripheral surfaces of the inner core portions 31*a* and 31*b*. In the state in which the coil 2, the magnetic core 3, and the interposed member 5 are assembled, the above-described four support pieces 51 support the corner portions near the end surface 31*e* of the outer peripheral surface of one inner core portion 31*a* (or 31*b*). Due to this support, the inner core portions 31*a* and 31*b* are positioned at a predetermined position with respect to the wound portions 2*a* and 2*b*. Also, the intervals between the wound portions 2*a* and 2*b* and the inner core portions 31*a* and 31*b* are set to a predetermined size.

In the present example, the thicknesses of the above-described four support pieces 51 are different. Specifically, the thicknesses of the support pieces 51 arranged on the installation target 100 side (lower side) are thinner than the thicknesses of the support pieces 51 arranged on the side opposite to the installation target 100 (upper side) (see the interposed member 5 on the right side in FIG. 3). Due to the inner core portions 31*a* and 31*b* being supported by this kind of support piece 51, the intervals between the wound portions 2*a* and 2*b* and the inner core portions 31*a* and 31*b* are suitably maintained at the above-described size (see also FIG. 2A).

In addition, in the present example, groove portions into which the vicinity of the end portions of the wound portions 2*a* and 2*b* and portions of the winding wires 2*w* are fit are provided in regions toward the wound portions 2*a* and 2*b* in the interposed members 5 (see the interposed member 5 on the right side in FIG. 3). Portions of the above-described winding wires 2*w* are pulled-out portions of the winding wires 2*w* that have been pulled out from the wound portions 2*a* and 2*b*. Due to the vicinities of the end portions of the wound portions 2*a* and 2*b* and the pulled-out portions being fit into the groove portions, the wound portions 2*a* and 2*b* are accurately positioned with respect to the interposed members 5. The positions of the inner core portions 31*a* and 31*b* with respect to the wound portions 2*a* and 2*b* are also accurately determined via the interposed member 5. For this reason, the reactor 1 can accurately maintain the intervals between the wound portions 2*a* and 2*b* and the inner core portions 31*a* and 31*b*.

The two support pieces 52 arranged on the outer core portion 32 side in the interposed member 5 prevent vertical positional misalignment of the outer core portions 32. The support pieces 52 are flat plate-shaped tongue pieces. The two support pieces 52 are arranged so as to sandwich the upper surface and the lower surface of the outer core portion 32. The joining surface 32*e* of the outer core portion 32 and its vicinity are accommodated in a recessed portion 54 that is provided on the outer core portion 32 side of the interposed member 5. The shape and size of the recessed portion 54 are adjusted such that a predetermined interval is provided between the outer peripheral surface of the outer core portion 32 and the inner wall of the inner portion 54 in the state in which the outer core portion 32 is accommodated in the recessed portion 54. This interval is a space that is in communication with the interval forming the above-described gap and the intervals between the inner core portions 31*a* and 31*b* and the opening edges of the through holes 5*h*. These intervals are used as flow paths of the above-described fluid resin. The above-described through holes 5*h* open on the bottom surface of the recessed portion 54. Also, the joining surface 32*e* of the outer core portion 32 abuts on the bottom surface of the recessed portion 54.

The interposed member 5 shown in FIG. 3 is an example, and the shape, size, and the like of the interposed member 5 can be changed as appropriate.

Constituent Material

Examples of the constituent material of the interposed member 5 include an electrically insulating material. Examples of the electrically insulating material include various types of resin. Examples of resin include thermoplastic resin and thermosetting resin. Specific examples of thermoplastic resin include polyphenylene sulfide (PPS) resin, polytetrafluoroethylene (PTFE) resin, liquid crystal polymer (LCP), polyamide (PA) resins such as nylon 6 and nylon 66, polybutylene terephthalate (PBT) resin, and acrylonitrile butadiene styrene (ABS) resin. Specific examples of thermosetting resin include unsaturated polyester resin, epoxy resin, urethane resin, and silicone resin. The interposed member 5 can be manufactured using a known molding method such as injection molding.

Resin Molded Portion

Due to including inner resin portions 61 that cover at least portions of the inner core portions 31*a* and 31*b* and outer resin portions 62 that cover at least portions of the outer core portions 32, the resin molded portion 6 exhibits, for example, the following effects.

(A) The resin molded portion 6 mechanically protects the core pieces.

(B) The resin molded portion 6 protects the core pieces from the external environment (improves corrosion resistance).

(C) The resin molded portion 6 improves the insulation between the core pieces, the coil 2, and the surrounding parts.

The inner resin portions 61 of the present example mainly cover the regions of the outer peripheral surfaces of the inner core portions 31*a* and 31*b* other than portions of the end surfaces 31*e* and the locations supported by the interposed member 5. The outer resin portions 62 of the present example mainly cover the regions of the outer peripheral surfaces of the outer core portions 32 other than the joining surfaces 32*e*. Since a wide range of the outer peripheral surface of the magnetic core 3 is covered by the resin molded portion 6, the reactor 1 of the present example more easily obtains the above-described effect.

Also, the resin molded portion 6 of the present example is an integrated object in which the inner resin portions 61 and the outer resin portions 62 are formed continuously with each other. Also, the resin molded portion 6 of the present example integrally holds the set composed of the magnetic core 3 and the interposed member 5. For this reason, the resin molded portion 6 contributes also to an improvement in the strength of the integrated object of the set. Furthermore, a portion of the resin molded portion 6 of the present disclosure functions also as a magnetic gap as described above.

In particular, in the reactor 1 of the first embodiment, the thickness of the inner resin portion 61 differs in the peripheral direction, and the reactor 1 includes the thin portions 610 and the thick portions 612 (FIG. 2A). The thick portions 612 include the location at which the interval is the widest in the interval between the wound portions 2*a* and 2*b* and the inner core portions 31*a* and 31*b*, and a portion of the inner resin portion 61 is formed by filling the location at which the interval is relatively wide. The thin portion 610 forms the other portion of the inner resin portion 61 by filling at least a portion of the location at which the interval is relatively narrow.

Inner Resin Portion

The inner resin portion 61 of the present example is present in at least a portion of a tube-shaped space provided between the inner peripheral surface of the wound portion 2*a* (or 2*b*) and the outer peripheral surface of the inner core portion 31*a* (or 31*b*). That is, the inner resin portions 61 are present in the wound portions 2*a* and 2*b*. The inner resin portions 61 are formed by filling the tube-shaped space with a fluid resin serving as the raw material of the resin molded portion 6. In the present example, the electrically insulating material 7 is present in a portion of the tube-shaped space. For this reason, the inner resin portion 61 is C-shaped in a lateral cross section (FIG. 2A). The thickness of the inner resin portion 61 corresponds to the size of the tube-shaped space. That is, the thickness of the inner resin portion 61 corresponds to the interval between the wound portion 2*a* (or 2*b*) and the inner core portion 31*a* (or 31*b*) and is not a constant thickness along the peripheral direction of the wound portion 2*a* (or 2*b*). The thickness of the inner resin portion 61 is thin on the installation target 100 side (lower side) and is thick on the side opposite to the installation target 100 (upper side), as shown in FIG. 2A. The thickness will be described in detail later.

Outer Resin Portion

The outer resin portion 62 of the present example covers substantially the entirety of the outer peripheral surface of the outer core portion 32 along the outer core portion 32 (core pieces), except for the connecting surface 32*e* and the vicinity thereof. That is, the outer resin portions 62 are exposed without being covered by the wound portions 2*a* and 2*b*. Also, the outer resin portions 62 of the present example have an approximately uniform thickness. The covered region, thickness, and the like of the outer core portion 32 on the outer resin portion 62 can be selected as appropriate.

Constituent Material

Examples of the constituent material of resin molded portion 6 include various resins. Examples of resin include thermoplastic resin. Specific examples of thermoplastic resin include PPS resin, PTFE resin, LCP, PA resins such as nylon 6, nylon 66, nylon 10 T, nylon 9 T, and nylon 6 T, and PBT resin. The constituent material may also be a composite material containing the above-described resin and a filler with excellent thermal conductivity (e.g., a filler composed of alumina or silica, etc.). Due to including the filler, it is possible to achieve a resin molded portion 6 with an excellent heat dissipation property. The constituent material of the resin molded portion 6 and the constituent material of the interposed member 5 may also include the same resin. Due to including the same resin, both the resin molded portion 6 and the interposed member 5 have excellent bondability. Also, due to including the same resin, the thermal expansion coefficients of the resin molded portion 6 and the interposed member 5 are close to or substantially equal to each other. For this reason, separation due to thermal stress, cracking of the resin molded portion 6, and the like can be suppressed. Injection molding or the like can be used in the molding of the resin molded portion 6.

Interposed Object Between Wound Portion and Inner Core Portion

In the present example, subject matter relating to the interposed object between one wound portion 2*a* of the coil 2 and one inner core portion 31*a* of the magnetic core 3 is substantially the same regarding the interposed object between the other wound portion 2*b* and the other inner core portion 31*b*. For this reason, hereinafter, the wound portion 2*a* and the inner core portion 31*a* will be described as examples.

The reactor 1 of the present example includes the inner resin portion 61 and the electrically insulating material 7 between the wound portion 2*a* and the inner core portion 31*a*. Specifically, the reactor 1 includes a thick portion 612, which is a portion of the inner resin portion 61, over the entire location at which the above-described interval is relatively wide. The reactor 1 includes a thin portion 610, which is the remaining portion of the inner resin portion 61, at a portion of the location at which the interval is relatively narrow, and includes the electrically insulating material 7 at another portion. In particular, the reactor 1 includes the narrowest flat plate-shaped electrically insulating material 7 in the location at which the interval is relatively thin. The electrically insulating material 7 of the present example is a molded body that is independent of the resin molded portion 6.

Inner Resin Portion

The inner resin portion 61 of the present example is constituted by a uniform resin. For this reason, the thermal characteristics of the inner resin portion 61 are uniform. The thin portion 610 and the thick portion 612 have a thermal conductivity $\lambda 2$. The thin portion 610 of the present example is present in the region having the intervals $g_i$, $g_o$, and $g_{de}$. For this reason, the thin portion 610 has a thickness that corresponds to the intervals $g_i$, $g_o$, and $g_{de}$. The thick portion 612 of the present example is present in a region (region that is only hatched and not cross-hatched in FIG. 2B) excluding the location at which the interval is relatively narrow out of the region between the wound portion 2a and the inner core portion 31a. That is, the thick portion 612 is present in the region having the intervals $g_{ue}$ and $g_u$. For this reason, the thick portion 612 has a thickness that corresponds to the intervals $g_{ue}$ and $g_u$. The thickest location of the thick portion 612 has a thickness that corresponds to the interval $g_{ue}$ (=interval t2).

Electrically Insulating Material

The electrically insulating material 7 is composed of various electrically insulating materials. Due to the electrically insulating material 7 being interposed between the wound portion 2a and the inner core portion 31a, the electrical insulation of the wound portion 2a and the inner core portion 31a can be improved.

Constituent Material

λ1=λ2

Examples of the electrically insulating material 7 include a molded body including a resin that is the same as the constituent resin of the inner resin portion 61. The thermal conductivity λ1 of the electrically insulating material 7 is substantially the same as the thermal conductivity λ2 of the thick portion 612 (λ1=λ2). On the other hand, the interval t1 (here, interval $g_d$) of the location at which the electrically insulating material 7 is arranged is smaller than the interval t2 (here, interval $g_{ue}$) of the location at which the thick portion 612 is arranged (t1<t2). Accordingly, this mode satisfies (interval t1/thermal conductivity Δ1)<(interval t2/thermal conductivity λ2) and an excellent heat dissipation property is achieved. In particular, the smaller the interval t1 is, the more excellent the heat dissipation property is.

Also, if the electrically insulating material 7 is the molded body including the resin, the electrical insulation between the wound portion 2a and the inner core portion 31a can be improved by both the inner resin portion 61 and the electrically insulating material 7. Furthermore, in this case, the set composed of the inner resin portion 61 and the electrically insulating material 7 can improve the mechanical strength. The thermal expansion coefficient of the inner resin portion 61 and the thermal expansion coefficient of the electrically insulating material 7 are substantially equal to each other. For this reason, deformation, cracking, and the like of the inner resin portion 61 accompanying a difference in the thermal expansion coefficients are not likely to occur. In the case where the constituent material of the inner resin portion 61 includes the composite resin including the above-described filler, the difference from the thermal expansion coefficient of the inner resin portion 61 is easily reduced if the electrically insulating material 7 uses at least the resin component in common. If the electrically insulating material 7 is composed of the composite resin including the filler and the filler also has excellent electrical insulation, excellent electrical insulation is achieved.

λ1>λ2

Other examples of the electrically insulating material 7 include an electrically insulating material composed of a constituent material with a higher thermal conductivity than the constituent material of the inner resin portion 61. The thermal conductivity λ1 of the electrically insulating material 7 is higher than the thermal conductivity λ2 of the inner resin portion 61 (thick portion 612) (λ1>λ2). Also, the interval t1 is smaller than the interval t2 as described above. Accordingly, this mode satisfies (interval t1/thermal conductivity λ1)<(interval t2/thermal conductivity λ2). In particular, the electrically insulating material 7 is arranged at the narrowest location out of the location at which the interval is relatively narrow. For this reason, the reactor 1 can efficiently perform heat transmission from the inner core portion 31a, through the electrically insulating material 7, and to the wound portion 2a. Accordingly, this mode has a more excellent heat dissipation property. In particular, the greater the thermal conductivity λ1 is, the more excellent the heat dissipation property is. Also, the smaller the interval t1 is, the more excellent the heat dissipation property is.

Examples of the constituent material of the electrically insulating material 7 with the high thermal conductivity include a composite resin including the above-described fillers, and various ceramics. Examples of the ceramics include alumina and aluminum nitride. A plate material composed of the composite resin or the ceramics can be used as the electrically insulating material 7. In addition, the electrically insulating material 7 made of resin may also be various heat dissipation sheets or the like composed of silicone resin or the like. If an electrically insulating material 7 including an adhesive layer on one surface of a heat dissipation sheet or one surface of a ceramic plate is used, the reactor 1 has excellent manufacturability. The electrically insulating material 7 including the adhesive layer can be adhered to the outer peripheral surface of the inner core portion 31a in the process of manufacturing the reactor 1. For this reason, the inner core portion 31a and the electrically insulating material 7 can be simultaneously inserted into the wound portion 2a. In addition, examples of the electrically insulating material 7 with high thermal conductivity include an electrically insulating material 7 that includes an insulating layer on an outer surface of a base material composed of metal. Examples of the metal include aluminum or an alloy thereof. Examples of the constituent material of the insulating layer include various resins and ceramics such as alumina.

λ1<λ2

Yet other examples of the electrically insulating material 7 include an electrically insulating material 7 with a thermal conductivity that is less than the thermal conductivity λ2 of the inner resin portion 61 (thick portion 612) (λ1<λ2). The electrically insulating material 7 is arranged at the location at which the interval is the narrowest. For this reason, even if the electrically insulating material 7 does not have a thermal conductivity that is greater than or equal to the thermal conductivity λ2 of the inner resin portion 61, if (interval t1/thermal conductivity λ1)<(interval t2/thermal conductivity λ2) is satisfied, heat can be dissipated to the wound portion 2a due to the distance from the inner core portion 31a to the wound portion 2a being short. In this mode, the smaller the interval t1 is, the more excellent the heat dissipation property is. Also, it is more preferable the greater the thermal conductivity λ1 is within a range of satisfying λ1<λ2. Depending on the size of the interval t1, if the thermal conductivity λ2 is at most 2.5 times the thermal conductivity λ1, and furthermore less than 2 times the thermal conductivity λ1, (interval t1/thermal conductivity λ1) is likely to be smaller than (interval t2/thermal conductivity λ2).

Examples of the electrically insulating material 7 that satisfies λ1<λ2 include insulating paper and insulating film. Very thin insulating paper and insulating film are commercially available. Examples of the thickness include 10 μm or more and 200 μm or less, and furthermore 180 μm or less, 150 μm or less, and 100 μm or less. If the electrically insulating material 7 is thin in this manner, the interval t1 can also be made thin according to the thickness of the electrically insulating material 7. For this reason, (interval t1/thermal conductivity λ1) can be made much smaller than (interval t2/thermal conductivity λ2), and thus the reactor 1 can improve the heat dissipation property.

Examples of the insulating paper include insulating paper including cellulose fibers or aramid fibers. Examples of the insulating film include insulating film composed of resin such as polyethylene terephthalate (PET), polyethylene naphthalate (PEN), or polyimide. It is possible to use a commercially-available insulating paper or a commercially-available insulating film. It is preferable that the electrically insulating material 7 is used by cutting the insulating paper or the insulating film according to the size of arrangement location. If an insulating film including an adhesive layer or the like is used, the reactor 1 also has excellent manufacturability as described above.

Shape

The electrically insulating material 7 of the present example is a flat plate material. The flat plate material has a thickness that is approximately equal to the interval $g_a$. Also, the flat plate material has a surface area that is approximately equal to that of the location that is not covered by the interposed member 5 on the surface (lower surface) on the installation target 100 side of the inner core portion 31*a*. The flat plate-shaped electrically insulating material 7 is located so as to approximately fill the space between the surface (lower surface) on the installation target 100 side of the inner peripheral surface of the wound portion 2*a* and the lower surface of the inner core portion 31*a*. In addition, the electrically insulating material 7 may also be, for example, a rod material instead of the flat plate material.

Number

The reactor 1 of the present example includes one electrically insulating material 7 per wound portion 2*a*. Due to the number of the electrically insulating material 7 being small, the reactor 1 has excellent manufacturability. This is because it is easy to shorten assembly time in the process of manufacturing the reactor 1. Due to the fact that the electrically insulating material 7 of the present example is a flat plate material and can easily be arranged in a flat plate-shaped location as well, the reactor 1 has excellent manufacturability. The reactor 1 may also include multiple electrically insulating materials 7 with respect to one wound portion 2*a*. For example, if the electrically insulating material 7 is the above-described rod material, the reactor 1 may also include multiple rod materials spaced apart in the peripheral direction of the wound portion 2*a*.

Occupation Percentage

The percentage occupied by the electrically insulating material 7 with respect to the location in which the interval is relatively narrow in the one wound portion 2*a*, that is, the percentage occupied by the electrically insulating material 7 at the narrowest location can be selected as appropriate. For example, the occupation percentage is the area percentage in a lateral cross-section, and may be 5% or more and 95% or less. The lateral cross-sectional area of the location in which the interval is relatively narrow has an occupation percentage of 100%. In the illustration shown in FIG. 2B, the U-shaped location denoted by cross-hatching has an occupation percentage of 100%. Also, if multiple electrically insulating materials 7 are included, the occupation percentage is the percentage of the total area of the multiple electrically insulating materials 7. The occupation percentage in this example is the area percentage in a lateral cross-section, and is 5% or more and 30% or less. It can be said that this kind of reactor 1 has, to a certain extent, many thin portions 610 at the location at which the interval is relatively narrow. Due to there being many thin portions 610, and consequently, many inner resin portions 61 to a certain extent, it is easy to improve the strength of the magnetic core 3 using the resin molded portion 6. This is because if the multiple core pieces are integrated by the resin molded portion 6 as in the present example, the strength of the integral object of the magnetic core 3 is easily increased. On the other hand, the occupation percentage of the electrically insulating material 7 may also be greater in the above-described range (5% to 95%). That is, the percentage of the thin portions 610 may also be small. In this case, the resin molded portion 6 has excellent manufacturability. This is because there are few relatively narrow locations in the filling location of the fluid resin and thus it is easier to fill with the fluid resin.

The shape and size of the electrically insulating material 7, the arrangement position and number of the electrically insulating materials 7 at the location at which the interval is relatively narrow, the occupation percentage of the electrically insulating material 7 with respect to the location at which the interval is relatively narrow, and the like can be selected as appropriate.

Other

In the reactor 1 of the present example, substantially only the electrically insulating material 7 exists at the narrowest location of the location at which the interval is relatively narrow. With this kind of reactor 1, the resin molded portion 6 is easily manufactured and an excellent manufacturability is achieved. In the process of manufacturing the reactor 1, if the resin molded portion 6 is formed in at state in which the electrically insulating material 7 is arranged at the narrowest location, the locations other than the narrowest location can be made into flow paths for the fluid resin. For this reason, the flow paths easily become relatively wide. Accordingly, the flow paths are easily filled with the fluid resin.

Note that the electrically insulating material 7 and a portion of the resin molded portion 6 can also be included at the narrowest location. However, from the viewpoint of manufacturability, it is preferable that the narrowest location includes only the electrically insulating material 7.

Method for Manufacturing Reactor

The reactor 1 of the first embodiment is manufactured as follows, for example. A combined body 10 including the coil 2, the magnetic core 3, and the electrically insulating material 7 is produced (FIG. 3). The combined body 10 is accommodated in a mold (not shown) of the resin molded portion 6. The magnetic core 3 is covered with the fluid resin while the outer peripheral surface of the wound portions 2*a* and 2*b* of the coil 2 are exposed. The fluid resin is solidified to form the resin molded portion 6.

The combined body 10 of the present example includes the interposed member 5. By using the interposed member 5, the combined body 10 can be easily constructed. Specifically, the wound portions 2*a* and 2*b* are arranged in the groove portions of the interposed member 5. The inner core portions 31*a* and 31*b* are attached until they abut on the end surface support portions 53. The outer core portions 32 are accommodated in the recessed portions 54. The coil 2 and the magnetic core 3 can be easily positioned with respect to the interposed member 5 in this manner. Also, in the present example, the inner core portions 31*a* and 31*b* and the electrically insulating materials 7 are sequentially inserted into the wound portions 2*a* and 2*b*. Alternatively, the electrically insulating materials 7 are bonded to the inner core portions 31*a* and 31*b* in advance, and the bonded results are simultaneously inserted into the wound portions 2*a* and 2*b*. By doing so, it is possible to construct a combined body 10 in which the inner core portions 31*a* and 31*b* and the electrically insulating materials 7 are present in the winding. portions 2*a* and 2*b*.

For example, the fluid resin may be introduced into the combined body 10 accommodated in the mold in one direction from the outer end surface of the one outer core portion 32 to the outer end surface of the other outer core portion 32. Alternatively, the fluid resin may be introduced in two directions from the outer end surfaces of the two outer core portions 32 to the wound portions 2*a* and 2*b*. In either case, the fluid resin sequentially flows into the gaps below to fill the gaps from the outer end surface of the outer core portion 32. First, the fluid resin flows into the gap between the outer peripheral surface of the outer core portion 32 and the inner wall of the recessed portion 54 of the interposed member 5. Next, the fluid resin flows through the gap created by the interposition of the end surface support portion 53 and into the gap between the wound portions 2*a* and 2*b* of the coil 2 and the outer peripheral surfaces of the inner core portions 31*a* and 31*b*. After the filling with the fluid resin, the resin molded portion 6 is formed by solidifying the fluid resin.

Application

The reactor 1 of the first embodiment can be used as a component of a circuit that performs a voltage step-up operation or a voltage step-down operation, and for example, can be used as a constituent component of various types of converters and power conversion apparatuses. Examples of converters include an in-vehicle converter (typically a DC-DC converter) mounted in a vehicle such as a hybrid automobile, a plug-in hybrid automobile, an electric automobile, or a fuel call automobile, and a converter for an air conditioner.

Effect

The reactor 1 of the first embodiment has an excellent heat dissipation property.

The outer peripheral surfaces of the wound portions 2*a* and 2*b* of the coil 2 are exposed substantially without being covered by the resin molded portion 6. For this reason, the wound portions 2*a* and 2*b* can come into direct contact with a liquid refrigerant or a fluid refrigerant such as wind from a fan, or can be brought close to the installation target 100 or a cooling mechanism, and thus have an excellent heat dissipation efficiency.

A relatively narrow location is present between the wound portions 2*a* and 2*b* of the coil 2 and the inner core portions 31*a* and 31*b* of the magnetic core 3. The narrowest location of the relatively narrow location is provided at a position corresponding to the installation target 100 side of the wound portions 2*a* and 2*b*. For this reason, the distances from the inner core portions 31*a* and 31*b* to the heat dissipation locations of the wound portions 2*a* and 2*b* are short. As a result, the reactor 1 can efficiently dissipate heat from the inner core portions 31*a* and 31*b* to the wound portions 2*a* and 2*b*, and can further dissipate heat to the installation target 100.

The other portion of the relatively narrow location is provided at a position corresponding to the surface (in the wound portion 2*a* of FIG. 2A, the right surface; in the wound portion 2*b*, the left surface) on the side from which both of the wound portions 2*a* and 2*b* are spaced apart. For this reason, if the cooling mechanism is brought close to the sides of the wound portions 2*a* and 2*b*, for example, the distances to the heat dissipation locations of the wound portions 2*a* and 2*b* are short. As a result, the reactor 1 can efficiently dissipate heat from the inner core portions 31*a* and 31*b* to the wound portions 2*a* and 2*b*, and can further dissipate heat to the cooling mechanism.

The reactor 1 satisfies (interval t1/thermal conductivity $\lambda 1$)<(interval t2/thermal conductivity $\lambda 2$). For this reason, an excellent heat dissipation. ability is achieved not only in the case where the thermal conductivity $\lambda 1$ of the electrically insulating material 7 is greater than or equal to the thermal conductivity $\lambda 2$ of the thick portion 612, but also in the case where the thermal conductivity $\lambda 1$ is smaller than the thermal conductivity $\lambda 2$.

The reactor 1 of the present example has an excellent heat dissipation property due to the following reasons.

The reactor 1 includes the thin portion 610 at a location that is relatively narrow. For this reason, the reactor 1 has a more excellent heat dissipation property compared to the case where air is included in the relatively narrow location.

The surfaces of the wound portions 2*a* and 2*b* on the installation target 100 side and the surfaces on the sides spaced apart from each other are flat plate-shaped surfaces. For this reason, the heat dissipation areas of the wound portions 2*a* and 2*b* are wide, and the reactor 1 has a more excellent heat dissipation efficiency.

If the thermal conductivity $\lambda 1$ of the electrically insulating material 7 is greater than the thermal conductivity $\lambda 2$ of the thick portion 612, the reactor 1 has a more excellent heat dissipation property.

The reactor 1 of the present embodiment further exhibits the following effects.

The reactor 1 has excellent manufacturability.

The reactor 1 includes a relatively wide location as the forming location of the thick portion 612 in the spaces between the wound portions 2*a* and 2*b* and the inner resin portions 61. For this reason, in the reactor 1, the fluid resin, which is the raw material of the resin molded portion 6, easily fills the spaces, and the resin molded portion 6 is easily formed.

The electrically insulating material 7 is a molded body that is independent of the resin molded portion 6. For this reason, there is no need to fill the narrowest location in the space with the fluid resin, filling with the fluid resin is easy, and filling can be performed accurately.

The reactor 1 includes the interposed member 5 on which multiple support pieces 51 with different thicknesses are provided. For this reason, the reactor 1 can efficiently and easily mold the inner resin portion 61 that has a predetermined thickness corresponding to the size of a predetermined interval by adjusting the thickness of the support piece 51 of the interposed member 5 according to the interval.

The reactor 1 includes the interposed member 5 that has the above-described predetermined shape. For this reason, the reactor 1 can easily position the coil 2 and the magnetic core 3 via the interposed member 5, and thus is easy to assemble.

The reactor 1 has excellent mechanical strength due to including the electrically insulating material 7, which is a molded body that is independent of the resin molded portion 6. The lateral cross-section of the inner resin portion 61 is C-shaped. For this reason, the inner resin portion 61 can elastically deform to a certain extent. As a result, the reactor 1 easily prevents the occurrence of cracking and the like in the inner resin portion 61 resulting from thermal stress and the like.

In addition, the reactor 1 of the first embodiment can achieve mechanical protection of the magnetic core 3, protection from the external environment, an improvement in electrical insulation from the coil 2, and the like with the resin molded portion 6.

Second Embodiment

A reactor of a second embodiment will be described with reference to FIGS. 4A and 4B.

Figure 4B:
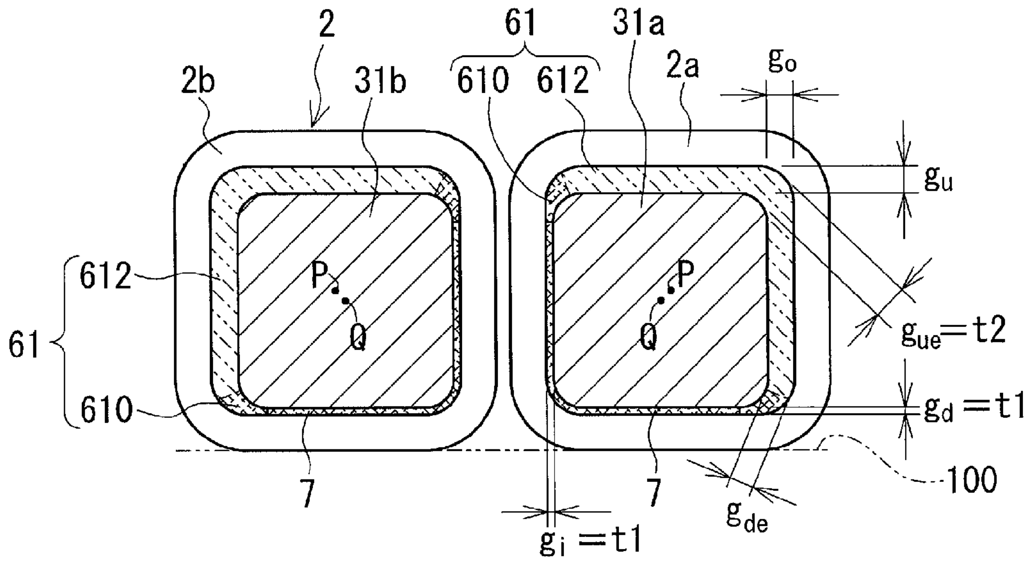
FIG. 4B is a diagram illustrating an interval between a wound portion and an inner core portion in the reactor shown in FIG. 4A.

FIG. 4B is an illustrative diagram using a drawing that is the same as that of FIG. 4A. FIG. 4B is a diagram for illustrating an interval between the wound portions 2_a_ and 2_b_ and the inner core portions 31_a_ and 32_b_.

As shown in FIG. 4A, the basic configuration of the reactor of the second embodiment is similar to that of the reactor 1 (see FIG. 2A) of the first embodiment. In the reactor of the second embodiment, one difference from the first embodiment is that the inner core portions 31_a_ and 31_b_ are distributed unevenly at the corner portions on the sides (inner sides) at which the wound portions 2_a_ and 2_b_ are close to each other. Also, another difference is that the interval t1 of the narrowest location of the interval between the wound portions 2_a_ and 2_b_ and the inner core portions 31_a_ and 31_b_ is smaller than that in the first embodiment.

Hereinafter, the differences will mainly be described, and detailed description of configurations and effects that are redundant with those of the first embodiment will be omitted. Also, similarly to the first embodiment, the wound portion 2_a_ and the inner core portion 31_a_ will be described as examples.

As shown in FIG. 4B, in the reactor of the second embodiment, the axis Q has been shifted downward and to the side (inner side) at which the wound portions 2_a_ and 2_b_ are close to each other, from the state in which the axis P of the wound portion 2_a_ and the axis Q of the inner core portion 31_a_ are coaxial. In this state, the interval between the wound portion 2_a_ and the inner core portion 31_a_ differs in the peripheral direction of the wound portion 2_a_. The interval $g_{ue}$ of the corner portions on the upper side of the interval between the wound portion 2_a_ and the inner core portion 31_a_ is the largest. The interval $g_i$ on the inner side, the interval of the corner portion on the inner side and lower side, and the interval $g_d$ on the installation target 100 side (lower side) are the smallest ($g_i=g_d=$t1). The interval $g_u$ on the upper side and the interval $g_o$ on the side (outer side) at which the wound portions 2_a_ and 2_b_ are spaced apart from each other are equal to each other, and are greater than 70% of the maximum value (=interval $g_{ue}$=t2) of the interval. The interval of the location that is 70% of the maximum value of the interval among the corner portions on the outer side and the lower side is the interval $g_{de}$. If the location that satisfies the condition of being 70% or less of the maximum value of the interval is the relatively narrow location, the relatively narrow location has an L shape. The electrically insulating material 7 and a portion (thin portion 610) of the inner resin portion 61 are present at the relatively narrow location (FIG. 4A). Also, if the location that satisfies the condition of being greater than 70% of the maximum value of the interval is the relatively wide location, the relatively wide location has an inverted L shape. The thick portion 612 is present at the relatively wide location (FIG. 4A).

In the present example, the intervals $g_d$ and $g_i$, which are the minimum values of the interval, are 5% or more and 25% or less of the interval $g_{ue}$, which is the maximum value of the interval, and are smaller than in the first embodiment. In this respect, the interval t1 is easily made much smaller than the interval t2. The electrically insulating material 7 is present at the narrowest location. A thin object such as insulating paper or insulating film can be suitably used as the electrically insulating material 7 of the present embodiment. Even if the electrically insulating material 7 is the insulating paper, the insulating film, or the like and the thermal conductivity λ1 is made greater than the thermal conductivity λ2 of the thick portion 612, the interval t1 is much smaller than the interval t2 as described above. Because of this, the reactor of the second embodiment satisfies (interval t1/thermal conductivity λ1)<(interval t2/thermal conductivity λ2).

Also, in the present example, the length percentage of the location at which the interval is relatively narrow with respect to the inner peripheral length of the one wound portion 2_a_ is 40% or more and 60% or less, and is smaller than in the first embodiment. Accordingly, it can be said that the reactor of the present example includes more locations at which the interval is relatively wide than in the first embodiment. Also, the minimum value of the interval is smaller than that of the first embodiment as described above. For this reason, the reactor of the second embodiment easily ensures a larger maximum value (=interval $g_{ue}$=t2) of the interval compared to the first embodiment.

Furthermore, in the present example, percentage of the area occupied by the electrically insulating material 7 with respect to the location at which the interval is relatively narrow in the one wound portion 2_a_ is 60% or more and 80% or less, and is greater than in the first embodiment. Accordingly, it can be said that the reactor of the present example includes more electrically insulating materials 7 at the location at which the interval is the narrowest, compared to the first embodiment.

The reactor of the second embodiment has an excellent heat dissipation property due to reasons similar to those of the first embodiment. In particular, an excellent heat dissipation property is achieved due to the fact that the interval t1 is likely to be much smaller than the interval t2. With the reactor of the present example, an excellent heat dissipation property is achieved also due to the fact that the occupation percentage of the location at which the electrically insulating material 7 is present, that is, the location of the interval t1, is greater than that of the first embodiment (see the above-described percentage of area). Also, the reactor of the present example has an excellent heat dissipation property due to the fact that the location at which the interval is relatively narrow includes a flat plate-shaped location similarly to the first embodiment.

Furthermore, in the reactor of the present example, the relatively wide location is larger than that of the first embodiment as described above. For this reason, in the manufacturing process, filling with the fluid resin is more easily performed. Due to the resin molded portion including the inner resin portion 6 being easy to manufacture, the reactor of the second embodiment has a more excellent manufacturability. Filling with the fluid resin is easily performed also due to the fact that the relatively wide location is provided toward the upper sides and the outer sides of the wound portions 2*a* and 2*b* and the inner core portions 31*a* and 31*b*.

Furthermore, the reactor of the present example has excellent rigidity as an integrated object of the magnetic core resulting from being held in the resin molded portion. This is because the thick portions 612 are provided relatively on the upper sides and outer sides of the inner core portions 31*a* and 31*b*. Here, the lower sides of the inner core portions 31*a* and 31*b* are protected by the installation target 100. The inner sides of the inner core portions 31*a* and 31*b* that are adjacent to each other are protected due to the wound portions 2*a* and 2*b* being interposed. In contrast to this, it can be said that the upper sides and outer sides of the inner core portions 31*a* and 31*b* are likely to receive an impact or the like from the exterior. The reactor of the present example can effectively reinforce the upper sides and the outer sides of the inner core portions 31*a* and 31*b* using the thick portions 612.

In addition, due to including the insulating paper or the like at the location at which the interval is the narrowest, the reactor of the present example also has excellent electrical insulation between the wound portions 2*a* and 2*b* and the inner core portions 31*a* and 31*b* compared to the case of including air.

Third Embodiment

A reactor of a third embodiment will be described with reference to FIG. 5.

As shown in FIG. 5, the basic configuration of the reactor of the third embodiment is similar to that of the reactor 1 (see FIG. 2A) of the first embodiment. That is, the interval between the wound portion 2*a* and the inner core portion 31*a* and the interval between the wound portion 2*b* and the inner core portion 31*b* differ in the peripheral directions of the wound portions 2*a* and 2*b*. The inner resin portions 61 that include the thin portions 610 and the thick portions 612 are present between the wound portions 2*a* and 2*b* and the inner core portions 31*a* and 31*b*. However, the reactor of the third embodiment differs from the reactor 1 of the first embodiment in that it does not include the electrically insulating materials 7 that are independent of the resin molded portions 6. Hereinafter, the differences will mainly be described, and detailed description of configurations and effects that are redundant with those of the first embodiment will be omitted.

In the reactor of the third embodiment, the inner resin portions 61 are formed into tube shapes continuously in the axial directions of the wound portions 2*a* and 2*b*. The constituent resin of the inner resin portion 61 fills the entirety of the location at which the interval is relatively narrow, and the thin portions 610 are present therein. Portions of the thin portions 610 form the electrically insulating materials 7. Accordingly, the thermal conductivity $\lambda 1$ of the electrically insulating materials 7 is substantially the same as the thermal conductivity $\lambda 2$ of the thick portions 612 ($\lambda 1=\lambda 2$). The predetermined interval t1 in which the electrically insulating material 7 is arranged is smaller than the predetermined interval t2 in which the thick portion 612 is arranged ($t1<t2$). For this reason, the reactor of the third embodiment satisfies (interval t1/thermal conductivity $\lambda 1$)<(interval t2/thermal conductivity $\lambda 2$) and has an excellent heat dissipation property.

The reactor of the third embodiment has excellent manufacturability in that the electrically insulating material 7 that is independent of the resin molded portion 6 is not needed and the number of assembly steps can be reduced. Also, only the inner resin portions 61 composed of materials with uniform thermal expansion coefficients are present between the wound portions 2*a* and 2*b* and the inner core portions 31*a* and 31*b*. For this reason, the reactor of the third embodiment also has excellent strength in that cracking and the like of the inner resin portion 61 caused by a difference in the thermal expansion coefficient are not likely to occur.

The present disclosure is not limited to these examples but is indicated by the claims, and all modifications that fall within the meaning and range of equivalency with the claims are intended to be encompassed therein.

For example, at least one of the following modifications is possible in the above-described first to third embodiments.

Modified Example 1

The electrically insulating material includes air.

In this case, from the viewpoint of ensuring electric insulation between the wound portion and the inner core portion, it is preferable that electric insulation is sufficiently ensured by the coil, as described above.

Modified Example 2

Multiple electrically insulating materials (molded bodies) are arranged in one wound portion.

In this case, specifications such as the shape, size, and constituent material of the electrically insulating material can also all be made equal, or can all be made different. For example, one wound portion may also include the insulating paper and the resin molded body. If the multiple electrically insulating materials are included spaced apart from each other in the peripheral direction of the wound portion, the inner resin portions may also be interposed between the adjacent electrically insulating materials. Air may also be present between the adjacent electrically insulating materials without the inner resin portions being interposed therebetween. In this case, there is no need to fill the narrowest location with the fluid resin as described above, and the resin molded portion is easily formed.

Modified Example 3

The location at which the interval is the narrowest is provided at a position other than the installation target.

Description will be given with reference to FIG. 2A. The location at which the interval is the narrowest may also be provided between the surfaces (upper surfaces) of the inner peripheral surfaces of the wound portions 2*a* and 2*b* on the side opposite to the installation target 100 and the upper surfaces of the inner core portions 31*a* and 31*b*. Alternatively, the location at which the interval is the narrowest may also be provided between the side surfaces (the right surface in the wound portion 2*a* and the left surface in the wound portion 2*b*) on the sides of the inner peripheral surfaces of the wound portions 2*a* and 2*b* that are spaced apart from each other and the side surfaces of the inner core portions 31*a* and 31*b*. In this case, the cooling mechanism may be arranged close to the upper surfaces of the outer peripheral surfaces of the wound portions 2*a* and 2*b* and the above-described side surfaces.

Modified Example 4

The outer peripheral shape of the inner core portion is not analogous to the inner peripheral shape of the wound portion.

In this case, the interval between the wound portion and the inner core portion can be changed according to the inner peripheral shape of the wound portion and the outer peripheral shape of the inner core portion. It is preferable that the shape and the size of the wound portion and the inner core portion are adjusted such that the interval is a predetermined size. For example, if the inner peripheral shape of the wound portion is the square shape described in the first to third embodiments, the outer peripheral shape of the inner core portion may be a circular shape, a trapezoidal shape, or the like. Alternatively, the inner peripheral shape of the wound portion and the outer peripheral shape of the inner core portion may be rectangular and have different ratios between their long side lengths and their short side lengths.

Modified Example 5

The inner core portion is a set composed of multiple core pieces and multiple gap materials (may also be air gaps) (see JP 2017-135334A).

The set composed of the multiple core pieces and a solid gap material may be integrated using an adhesive, or may be integrated using the inner resin portion 61 of the resin molded portion 6.

Modified Example 6

The reactor includes at least one of the following (none are shown in the drawings).

A sensor that measures a physical amount of the reactor, such as a temperature sensor, a current sensor, a voltage sensor, or a magnetic flux sensor.

A heat dissipation plate that is attached to at least a portion of the outer peripheral surfaces of the wound portions 2*a* and 2*b* of the coil 2.

Examples of the heat dissipation plate include a metal plate and a plate material composed of a non-metal inorganic material with an excellent thermal conductivity. If the heat dissipation plate is provided at a location of the outer peripheral surfaces of the wound portions 2*a* and 2*b* that corresponds to the location at which the interval is relatively narrow, heat can be dissipated efficiently. To give a description with reference to FIGS. 2A and 4A, the heat dissipation plate may be provided on the surfaces (lower surfaces) of the outer peripheral surfaces of the wound portions 2*a* and 2*b* on the installation target side. In FIGS. 2A and 4A, the surfaces on the installation target 100 side of the wound portions 2*a* and 2*b* are positions that correspond to the locations at which the interval is the narrowest, and the electrically insulating material 7 is present thereon. In addition, the heat dissipation plates may also be arranged on the right surface of the outer peripheral surface of the wound portion 2*a* and the left surface of the outer peripheral surface of the wound portion 2*b*. Alternatively, the heat dissipation plates may also be provided at the locations at which the thick portions 612 are present. It is expected that this reactor can, to some extent, improve the drawing of heat from the inner core portions 31*a* and 31*b* to the wound portions 2*a* and 2*b* via the thick portions 612 using the heat dissipation plates.

A bonding layer that is interposed between the installation surface of the reactor 1 and the installation target 100, or between the installation surface and the above-described heat dissipation plate.

Examples of the bonding layer include an adhesive layer. If an adhesive layer with excellent electric insulation is used, even if the heat dissipation plate is a metal plate, the insulation between the wound portions 2*a* and 2*b* and the heat dissipation plate is improved, which is preferable.

An attachment portion that is molded in one piece with the outer resin portion 62 and is for fixing the reactor 1 to the installation target 100.

The invention claimed is:

1. A reactor comprising:

a coil having a wound portion;

a magnetic core that includes an inner core portion arranged inside of the wound portion and an outer core portion arranged outside of the wound portion; and a resin molded portion including an inner resin portion that fills at least a portion between the wound portion and the inner core portion and an outer resin portion that covers at least a portion of the outer core portion, wherein an interval between the wound portion and the inner core portion differs in a peripheral direction of the wound portion, the interval including a narrowest interval and a widest interval, the reactor includes an electrically insulating material that is interposed in a location at which narrowest interval t1, and the widest interval t2 to form a portion of the inner resin portion, and wherein a thermal conductivity of the electrically insulating material at the narrowest interval t1 is λ1, and the proportion of the interval t1 with respect to the thermal conductivity λ1 is (interval t1/thermal conductivity λ1), and wherein a thermal conductivity of the electrically insulating material at the widest interval t2 is λ2, and the proportion of the interval t2 with respect to the thermal conductivity λ2 is (interval t2/thermal conductivity λ2), wherein (interval t1/thermal conductivity λ1)<(interval t2/thermal conductivity λ2) is satisfied.

2. The reactor according to claim 1, wherein the reactor includes a thin portion that is interposed in at least a portion of the location at which the interval between the wound portion and the inner core portion is relatively narrow, the thin portion forming another portion of the inner resin portion.

3. The reactor according to claim 2, wherein the electrically insulating material and the thin portion are included at the location at which the interval between the wound portion and the inner core portion is relatively narrow.

4. The reactor according to claim 1, wherein the interval t1 of the narrowest location is 50% or less of the interval t2 of the widest location.

5. The reactor according to claim 1, wherein the wound portion has a quadrangular tube shape and the inner core portion has a quadrangular column shape, and the location at which the interval between the wound portion and the inner core portion is relatively narrow includes a flat plate-shaped location that is interposed between a surface of an inner peripheral surface of the wound portion and a surface of an outer peripheral surface of the inner core portion.

6. The reactor according to claim 1, wherein the thermal conductivity λ1 of the electrically insulating material is higher than the thermal conductivity λ2 of the thick portion.

7. The reactor according to claim 1, wherein the electrically insulating material includes at least one of insulating paper and insulating film.

8. The reactor according to claim 1, wherein the electrically insulating material includes a molded body including a resin that is the same as a constituent resin of the inner resin portion.

* * * * *